US007339679B2

(12) United States Patent
Drabarek et al.

(10) Patent No.: US 7,339,679 B2
(45) Date of Patent: Mar. 4, 2008

(54) INTERFEROMETRIC MEASURING DEVICE UTILIZING A SLANTED PROBE FILTER

(75) Inventors: Pawel Drabarek, Tiefenbronn (DE); Dominique Breider, Lonay (CH); Marc-Henri Duvoisin, Préverenges/Schweiz (CH); Dominique Marchal, Vallorbe (CH)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 10/529,424

(22) PCT Filed: Mar. 28, 2003

(86) PCT No.: PCT/DE03/01029

§ 371 (c)(1), (2), (4) Date: Mar. 25, 2005

(87) PCT Pub. No.: WO2004/029543

PCT Pub. Date: Apr. 8, 2004

(65) Prior Publication Data

US 2006/0033925 A1 Feb. 16, 2006

(30) Foreign Application Priority Data

Sep. 25, 2002 (DE) ................................ 102 44 552

(51) Int. Cl.
*G01B 9/02* (2006.01)

(52) U.S. Cl. ........................................................ 356/479

(58) Field of Classification Search ................ 356/477, 356/479, 497, 484, 485, 486, 489, 511
See application file for complete search history.

(56) References Cited

U.S. PATENT DOCUMENTS 6,741,355 B2 * 5/2004 Drabarek .................... 356/482

FOREIGN PATENT DOCUMENTS

| | | |
|---|---|---|
| DE | 198 08 273 | 9/1999 |
| DE | 198 19 762 | 11/1999 |

* cited by examiner

*Primary Examiner*—Patrick Connolly
(74) *Attorney, Agent, or Firm*—Kenyon & Kenyon LLP

(57) ABSTRACT

An interferometric measuring device for recording shape, roughness or separation distance of the surface of a measuring object, having a modulating interferometer, to which is supplied short coherent radiation by a radiation source, having a measuring probe that is spatially separated from the modulating interferometer and is coupled to it via a light-conducting fiber set-up, in which combined beam components are split in a common arm in a partially transmitting region into measuring and reference beams, and having receiver and evaluating devices for converting the supplied radiation into electrical signals and for evaluating the signals based on phase difference. A construction for reliable measurements even in tight hollow spaces provides that the partially transmitting region is formed by a slanting exit face of a probe fiber at an exit angle as to the optical probe axis and a likewise slanting entrance face, of a fiber section following on the object side, as to the optical probe axis at an entrance angle, a wedge-shaped gap being formed between the exit and entrance surfaces.

10 Claims, 2 Drawing Sheets

1
λ= 1.55μm
Δλ= 40nm
2
2.1
f
2.2
f+Δf
2.2'
2.1'
6.1
3
6
7
λ1
λ2
4.1
4.2
4
Δφ
5.1
5.2
5

L1
ΔL= L2 - L1
Lc
Lc
S (t)
S1 (t)
S2 (t)
2.11
2.4
2.2
2.6
2.12
2.10
2.3
1
2.11'
2.4'
2.2'
2.6'
2.12'
2.9'
6
2.11
L2 r1' (t)
r1 (t)
r2 (t)
r2' (t)
8
3.5
s2 (t)
s1 (t)
3.1
3.3
3.2
3.4

INTERFEROMETRIC MEASURING DEVICE UTILIZING A SLANTED PROBE FILTER

FIELD OF THE INVENTION

The present invention relates to an interferometric measuring device for recording the shape, the roughness or the separation distance of the surface of a measuring object using a modulation interferometer, to which a radiation source supplies short-coherent radiation and which has a first beam splitter for splitting the radiation supplied into a first beam component guided via a first arm and into a beam component guided via a second arm, of which the one is shifted with respect to the other, with the aid of a modulation device, in its light phase or light frequency, and passes through a delay line, and which are subsequently combined at an additional beam splitter of the modulation interferometer, and having a measuring probe, that is spatially separated from the modulation interferometer and is coupled or able to be coupled to the latter, in which the combined beam components are split up in a common arm in a partially transmitting region into a measuring beam and a reference beam, and whereupon the measuring beam reflected at the surface and the reference beam reflected at a reference plane are superposed, and having a receiver device and an evaluating device for converting the radiation supplied to it into electrical signals and for evaluating the signals on the basis of a phase difference.

BACKGROUND INFORMATION

Such an interferometric measuring device is discussed in German patent document no. 198 19 762. In this measuring device, one part, the so-called modulating interferometer, is spatially separated from the actual measuring probe, and is optically connected to it via a light-conducting fiber system, so that the measuring probe per se may be designed as a relatively simply constructed, easily manipulable unit. A broad-band, short-coherent radiation is supplied to the modulation interferometer, which is split into two beam components, at the input of the modulation interferometer with the aid of a beam splitter, of which the one is shifted in its light phase or light frequency with respect to the other, using a modulation device, such as an acousto-optic modulator.

In the modulating interferometer, one of the two beam components runs through a delay element which generates an optical path difference of the two beam components which is greater than the coherence length of the short-coherent radiation. In the measuring probe, in a measuring arm, with respect to a reference arm, an additional optical path difference is generated in such a way that the path difference effected by the delay element is compensated for, and, consequently, an interference is created of the reference radiation coming from the reference plane of the reference arm and the radiation coming back from the object surface in the measuring branch, which is subsequently analyzed so as to ascertain the desired surface property (shape, roughness, separation distance) via a phase evaluation. In the measuring probe, the measuring arm and the reference arm are situated in one exemplary embodiment in one common light path (common path), a partially transmitting element being provided for forming the measuring arm and the reference arm.

A similar interferometric measuring device having such a modulating interferometer and a measuring probe connected to it via a light-conducting fiber system is also discussed in German patent document no. 198 08 273, in a beam splitting and radiation detecting unit, using receiving equipment, a splitting of the radiation brought to interference into radiation components of different wavelength taking place, so as to form therefrom a synthetic wavelength and to increase the measuring range (range of unambiguity).

In the interferometric measuring devices named above, which are based on heterodyne interferometry, but which utilize the properties of a broad-band, short-coherent radiation, the modulating interferometer designed as a Mach-Zehnder interferometer has a system of classical optical components, such as collimation optics lying upstream of the input end of the beam splitter, the beam splitter and reflecting mirror at the input end and the output end. In this context, the beam components experience several reflections at the beam splitter surfaces and at the mirrors, before they are coupled in to the optical light-conducting fiber system. The optical components have to be positioned with great accuracy, since the effect of every angle error is doubled by the reflection. In this context, it is difficult to ensure the durability of a calibration. In connection with fitting in a glass plate to compensate for optical asymmetries, too, additional difficulties come about during the calibration. A costly construction is connected with these difficulties, an exact adjustment to the properties of the measuring probe being also required.

SUMMARY OF THE INVENTION

The exemplary embodiment and/or exemplary method of the present invention is based on the object of making available an interferometric measuring device of the type mentioned at the outset, which permits achieving as accurate as possible a measurement, using a simplified construction.

According to the exemplary embodiment and/or exemplary method of the present invention, it is provided that the partially transmitting region is formed using an exit face of a probe fiber that is slanting at an exit angle with respect to the optical probe axis, and using an entrance face of a fiber section following at the object side that is also slanting at an entrance angle with respect to the optical probe axis, between the exit face and the entrance face a wedge-shaped gap being formed.

Using these measures, there comes about a similar effect as when using a partially transmitting or partially reflecting coating in the partially transmitting region. Because of the slanting faces in conjunction with the numerical aperture, in this context, the characteristics of the portion of radiation transmitted to the surface of the measuring object, and coming from it, as well as the portion of radiation reflected in the partially transmitting region, may be influenced in a suitable manner so as to achieve interference patterns that may be able to be optimally evaluated.

In this context, the measures that the-exit face and the entrance face are inclined in the same direction with respect to the probe axis contribute to a functioning that is as good as possible, as well as the measures that the exit face and the entrance face are selected so that a Fresnel reflection occurs.

One arrangement that is advantageous for the functioning is that exit angle $\alpha$ is between 5° and 8°, and the entrance angle is between $\alpha$ and 0°.

The construction and the calibration are favored if the probe fiber and the fiber section are accommodated axially aligned in a tube-shaped receptacle which is surrounded by an outer tube of the measuring probe.

The measures, that on the end face of the receptacle, situated away from the measuring object, a positioning piece is provided that surrounds the probe fiber and is also accommodated concentrically to the tube, and that the fiber section is fixed in the object-end, front part of the receptacle and the probe fiber is fixed in the object-remote, rear part of the receptacle and/or the tube, favor the construction and precise calibration, as do the additional measures that the front part of the receptacle is separated from the rear part of the receptacle by diametrically opposite gaps, the one gap being limited at the rear by the elongation of the exit face of the probe fiber, and the other gap being limited on the front in the elongation of the slanting entrance face, and that the front part and the rear part of the receptacle are enclosed by a common sleeve-shaped retaining ring, which is surrounded on the outside by the tube.

For the construction and the manner of functioning, additionally the measure is advantageous that a front section of the fiber section has a lesser diameter than its rear section. An accurate measurement is supported by an object-side exit face of the fiber section being inclined at an exit angle of at least 46° to the axis normal. The measuring result may also be favorably influenced by the selection of the inclination of the object-side exit face.

Further measures also contribute to an advantageous construction, namely that the modulating interferometer has at least partially a polarization-maintaining, light-conducting structure in the form of an optical fiber conductor or an integrated optics, the light-conducting structure being opened (split) at at least one arm.

DETAILED DESCRIPTION

Figure 1:
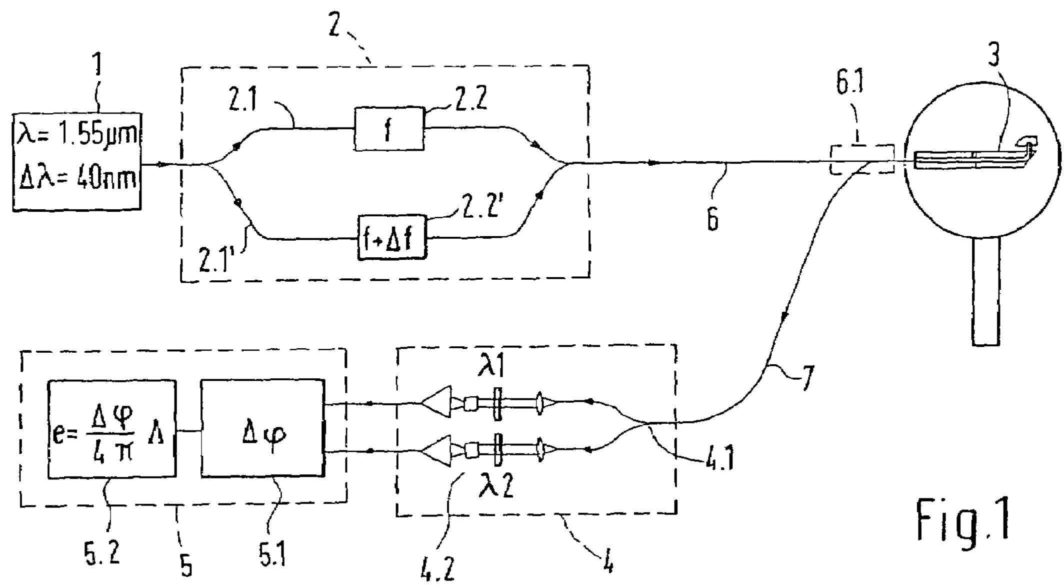
FIG. 1 shows a schematic representation of a construction of an interferometric measuring device having a modulating interferometer and a measuring probe.
Figure 2:
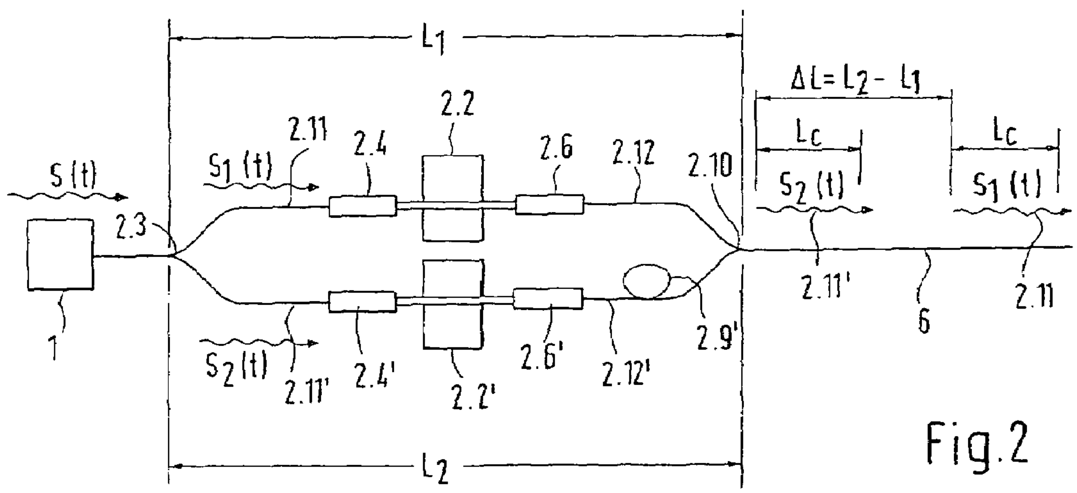
FIG. 2 shows a more detailed illustration of the modulating interferometer of FIG. 1.

As shown in FIG. 1, the interferometric measuring device based on the principle of heterodyne interferometry has a broad-band, short-coherent light source 1, whose radiation is supplied to a so-called modulating interferometer 2. In modulating interferometer 2, which is shown in greater detail in FIG. 2, radiation s(t) is split up at a first beam splitter 2.3 into a first beam component 2.1 guided via a first arm, having a partial radiation $s_1(t)$ and a second beam component 2.1' guided via a second arm, having a partial radiation $s_2(t)$, and is recombined at the exit side at an additional beam splitter 2.10, and from there it is conducted via a light-conducting fiber device 6 to a distant measuring probe.

From measuring probe 3, which is constructed, for example, as a Fizeau interferometer or a Mirau interferometer, as is explained in more detail in the documents named at the outset, the radiation subsequently reaches, via an additional light-conducting fiber device 7, a receiver device 4 having a beam splitting unit 4.1 and subsequent photoelectric receivers 4.2, in which a conversion into electrical signals takes place. In a subsequent evaluation unit 5, having a phase detector 5.1 and a computing unit 5.2, the properties of the measuring surface picked up using measuring probe 3 (such as roughness, shape, separation distance) are then ascertained.

Modulating interferometer 2 is arranged as a Mach-Zehnder interferometer, the two arms in connection to first beam splitter 2.3 having first and second entrance-side light-conducting fibers 2.11, 2.11', and first and second exit-side light-conducting fibers 2.12, 2.12', which lead to additional beam splitter 2.10. First beam splitter 2.3 is, in this case, formed in an optical fiber, by which the radiation coming from light source 1 is advanced. At the exit of the coupler thus formed, the beam components are collimated with the aid of lens-type coupling elements 2.4, 2.4', and the two collimated beam components pass through a first or a second modulating unit 2.2, 2.2', for instance, in the form of an acousto-optical modulator, a fiber optic piezo modulator or a thermal phase modulator, the modulating units 2.2, 2.2' being advantageously able to be developed also as integrated optical components. In order to correct the chromatic dispersion, at least one of beam components 2.1, 2.1' passes through a glass plate 2.7' which is situated in a first or a second light path 2.5, 2.5'. The choice of the positioning of the glass plate 2.7' and/or its thickness is determined by calculation. In their further course, first beam component 2.1 and second beam component 2.1' are conducted to a first or a second lens-type light guide element 2.6, 2.6' and coupled into the first or the second exit-side light-conducting fiber 2.12, 2.12'. First or second exit-side light-conducting fiber 2.12, 2.12' has a greater optical path length than the other light-conducting fiber to the extent that the optical path difference $\Delta L=L_2-L_1$ between the two arms is greater than the coherence length of the short-coherent radiation s(t) after running through filters 4.3 and 4.3'. One of the lens-type coupling elements 2.4, 2.4' or light-conducting elements 2.6, 2.6', for example, light-conducting element 2.6', may be fastened to a calibrating device using which the optical path difference $\Delta L$ may be adjusted, by hand or with the aid of a motor, for instance, while using a micrometer bench, in such a way that the path difference $\Delta L$ between the two arms is tuned to that of measuring probe 3 so as to effect interference using measuring probe 3. Light-conducting fibers 2.11, 2.11', 2.12, 2.12' are monomode. Besides, they are advantageously polarization-maintaining, especially if light source 1 is polarized and/or if modulating units 2.2, 2.2' are formed of double-refractive crystals and/or if installation at the coupling locations does not yield satisfactory stability with respect to the polarization direction in the two interferometer arms. To achieve the optical path difference, an optical alternate route 2.9' is provided, for example, in second exit-side light-conducting fiber 2.12'.

Probe 3, which is used to detect the object surface, which is arranged, for instance, as a Fizeau interferometer or a Mirau interferometer, has a reference branch having a reference plane and a measuring branch leading to the object surface, whose optical path differences are selected so that the path difference generated in modulating interferometer 2 is compensated for, so that the measuring beam coming from the object surface and the reference beam coming from the reference plane interfere when they are superposed. The interfering radiation is supplied to beam splitting unit 4.1 for spectral partitioning into components of different wavelengths, and is subsequently supplied to the allocated photoelectric receivers 4.2.

The desired surface property is ascertained from the interfering radiation and the electrical signals by evaluating the phase differences, by using phase detector 5.1 and subsequent calculating unit 5.2. In this context, the evaluated phase difference is created by the frequency difference, generated by the first or second modulating unit 2.2, 2.2', which, corresponding to the heterodyne method is relatively low with respect to the fundamental frequency. The calculation is carried out according to the formula:

$$\Delta\phi = 2\pi\cdot(2e/\Lambda)+\phi_0$$

where $\phi_0$ is a constant $\Lambda=\lambda_1\cdot\lambda_2/(\lambda_2-\lambda_1)$ is the synthetic wavelength of the measuring device, $\lambda_1$ is the wavelength at a first photoelectric receiver, $\lambda_2$ is the wavelength at a second photoelectric receiver, e is the measuring distance.

From this, using evaluation unit 5, the respective recorded distance of the surface at a measuring point is determined from the relationship:

$$e=\Delta\phi/(2\pi)\cdot(\Lambda/2).$$

Distance measure e is thus determined from a measurement of the phase between two electrical signals, and therefore the measurement is independent of the optical intensity received by the photodiodes.

Figure 3:
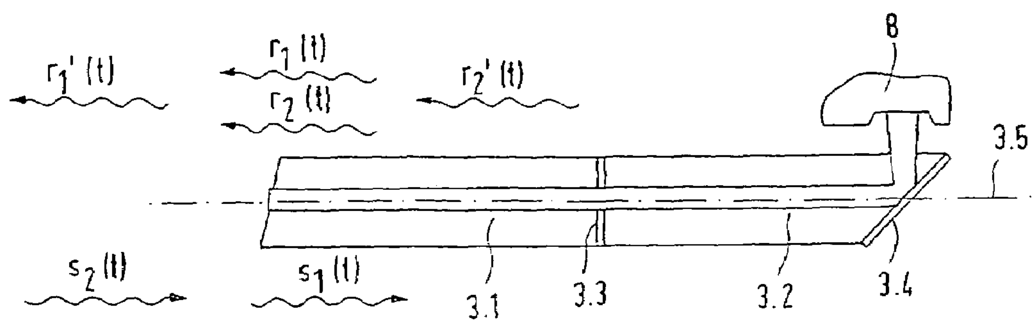
FIG. 3 shows the measuring probe and the measuring object in a side view with a representation of the radiation offset.

FIG. 3 shows a fiber part of the measuring probe, arranged as a Mirau interferometer having a monomode light-conducting fiber, and the path displacement of the incident $s_2(t)$ and $s_1(t)$, as well as the retracing radiation components $r_1'(t)$, $r_1(t)$, $r_2(t)$ and $r_2'$ (t) from the surface of measuring object 8 and a partially transmitting region 3.3 between an object-side exit surface 3.31 of a probe fiber 3.1 and an entrance face 3.32, farther away from the object, of a fiber section 3.2. The retracing portions of radiation $r_1'(t)$ and $r_1(t)$ come about, in this context, from that radiation $s_1(t)$ which has passed through the branch of modulating interferometer 2 without alternate route, portion of radiation $r_1'(t)$ being reflected by partially transmitting region 3.3 and portion of radiation $r_1(t)$ being reflected by the surface of measuring object 8.

By contrast, the retracing portions of radiation $r_2(t)$ and $r_2'(t)$ come about from that radiation $s_2(t)$ of modulating interferometer 2 which has passed through the optical alternate route, retracing portion of radiation $r_2(t)$ having being reflected by partially transmitting region 3.3 and retracing portion of radiation $r_2'(t)$ having being reflected by the surface of measuring object 8. It is shown that, corresponding to the compensation of the path difference ΔL formed in modulating interferometer 2 by measuring probe 3, only the retracing portions of radiation $r_1(t)$ and $r_2(t)$ lie within the coherence length and interfere with each other.

In the exemplary embodiment as in FIG. 3, object-side exit face 3.4 of fiber section 3.2 is inclined, which may be at an angle of 45° with respect to optical probe axis 3.5. A reflective metallic or dielectric coating is applied to exit face 3.4. The radiation is bent in this manner essentially at right angles and guided to the surrounding surface of the object, and the radiation reflected by the face reenters the light-conducting fiber via exit face 3.4.

Figure 4:
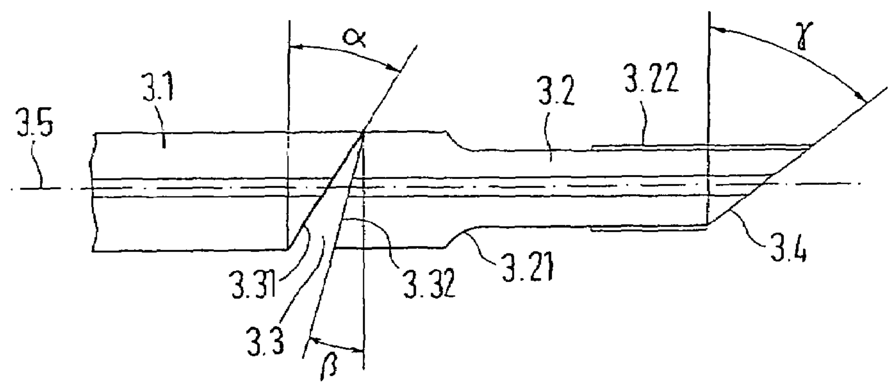
FIG. 4 shows a schematic representation of a fiber part of the measuring probe in a side view.
Figure 5:
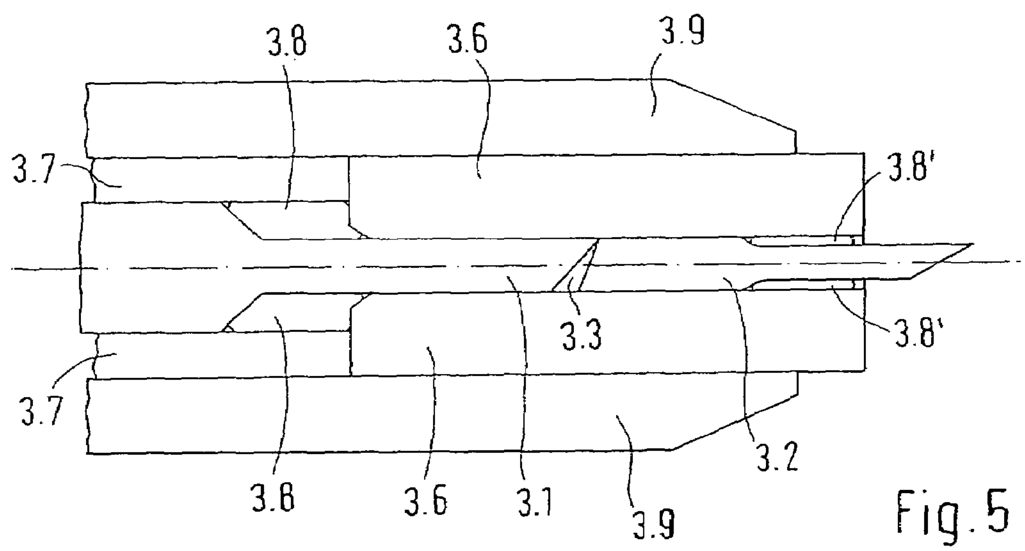
FIG. 5 shows the front section of the measuring probe in a schematic lateral representation.
Figure 6:
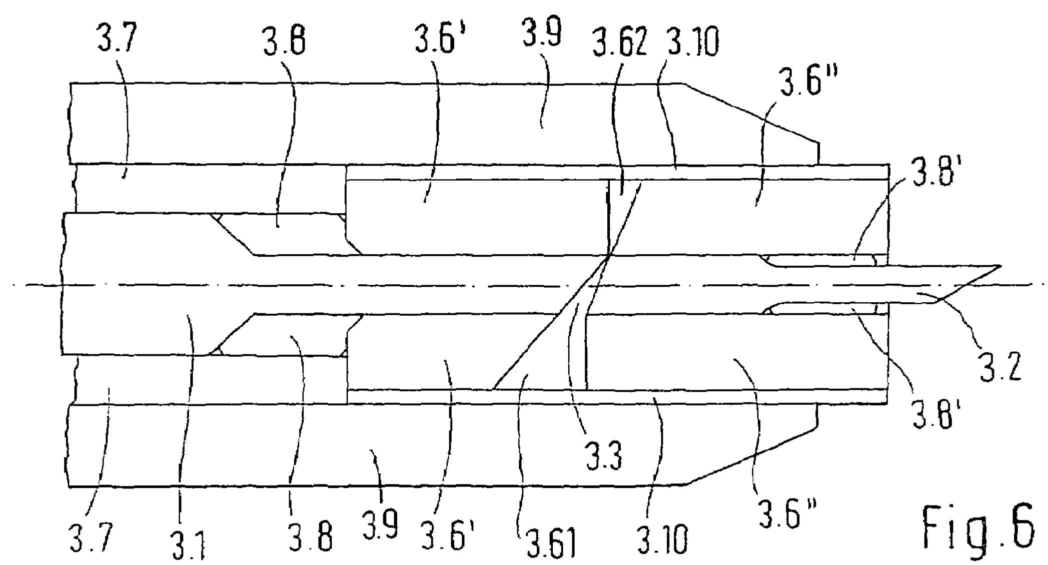
FIG. 6 shows a further exemplary embodiment of the front section of the measuring probe in a schematic lateral representation.

As shown in FIGS. 4 to 6, partially transmitting region 3.3 is formed between exit face 3.31 of probe fiber 3.1 and entrance face 3.32 of fiber section 3.2 by an inclination of exit face 3.31 by an angle α with respect to the normal of probe axis 3.5, and by an inclination of entrance face 3.32 of fiber section 3.2 by an angle β with respect to the normal of probe axis 3.5, the angle α being greater than the angle β, and a wedge-shaped gap coming about between exit face 3.31 and entrance face 3.32. The alignment of the inclination with respect to the normal is oriented in the same manner towards the object in the case of exit face 3.31 and entrance face 3.32. Angle α of exit face 3.31 is selected so that the radiation flow of the Fresnel reflection on exit face 3.31 is not guided by probe fiber 3.1.

For a monomode light-conducting fiber having a numerical aperture of 0.12, the angle α advantageously amounts to about 6°. Angle β is selected so that the radiation flow of the Fresnel reflection is guided onto entrance face 3.32 of fiber section 3.2 by the probe fiber, the extent of the radiation flow that is to be coupled into probe fiber 3.1 being taken into consideration. If angle β is equal to 0, the coupling rate amounts to about 3.6%. If angle β runs counter to angle α, the degree of coupling tends toward 0. If angle β tends counter to angle α, the transmission for this transition and a retracing radiation goes toward 86%. If, however, angle β is equal to 0, the transmission amounts to about 60%. A numerical aperture of 0.12 comes about, for example, at a wavelength of 1.550 nm and a diameter of 10.4 μm. Angle α should not be selected to be less than about 5°.

The reflection treatment of exit face 3.4 of fiber section 3.2 may be reduced or avoided if exit angle γ is increased so as to achieve total reflection at exit face 3.4. This is the case, for instance, in the case of a monomode light-conducting fiber having a numerical aperture of 0.12, at an exit angle gamma above 48°.

At the object-side end region of fiber section 3.2, an anti-reflection treatment 3.22 may be undertaken on the outer treatment (cladding), in order to reduce the sensitivity with respect to the Fresnel reflection, or exit angle gamma may be enlarged to the extent that the radiation flow of this reflection is no longer coupled into fiber section 3.2.

As shown in FIG. 5, probe fiber 3.1 and fiber section 3.2 may be accommodated in the same tubule-type accommodation 3.6 and brought into contact. Accommodation 3.6 is the same that is used for connectors of monomode light-conducting fibers. Accommodation 3.6 is inserted into a tube 3.9 of the measuring probe 3 that surrounds it. On the inside of tube 3.9, on the end face of accommodation 3.6 lying away from object, there is subsequently also a positioning piece 3.7 for guiding and preadjusting probe fiber 3.1. Fiber section 3.2 is fixed on the inside of the accommodation with the aid of adhesives 3.8', while probe fiber 3.1 is fixed in accommodation 3.6 and/or positioning piece 3.7 with the aid of adhesives 3.8.

Another procedure for aligning and fixing probe fiber 3.1 and fiber section 3.2 in probe 3 is shown in FIG. 6. Probe fiber 3.1 is introduced into a rear section 3.6' of tubule-type accommodation 3.6, and the front end face of accommodation section 3.6' and of exit surface 3.31 of probe fiber 3.1 are polished at the desired angle, the front end face in the region of the front-most edge of probe fiber 3.1 being directed normal to optical axis 3.5 of probe fiber 3.1.

Accordingly, the rear end face of a front section 3.6" of accommodation 3.6 is polished corresponding to the desired entrance surface 3.32 of fiber section 3.2, the region of the rear end face of front section 3.6" of accommodation 3.6, which is adjacent to the hindmost edge of fiber section 3.2, being aligned normal to optical axis 3.5 of probe fiber 3.1. Between rear section 3.6' and front section 3.6" of accommodation 3.6 there comes about, in this context, the set-up shown in FIG. 6 in longitudinal section. The two sections 3.6' and 3.6" of accommodation 3.6 are axially aligned with each other using a retaining ring 3.10 that is applied, for example slotted, and inserted into tube 3.9.

Furthermore, in tube 3.9 there is also inserted, in turn, bordering on the rear end face of accommodation 3.6, a concentric positioning piece 3.7 for calibrating and prefixing probe fiber 3.1, as in the exemplary embodiment according to FIG. 5. The fixing of probe fiber 3.1 and of fiber section 3.2 using adhesives 3.8, 3.8' thus also takes place corresponding to the exemplary embodiment according to FIG. 5, fiber section 3.6 being fixed in front section 3.6" of accommodation 3.6.

Sections 3.6' and 3.6" may be aligned by inserting them into a V-shaped profile. Because the two sections 3.6', 3.6" of accommodation 3.6 are inserted separately, the outermost end of measuring probe 3 may be changed immovably and corresponding to the property of the measuring object, the same probe fiber 3.1 being retained.

As FIGS. 4 to 6 also show, the outer section of fiber section 3.2 is reduced in its diameter, so that it may also be introduced into tight holes of a measuring object 8, whose diameter amounts to less than 130 μm. The diameter of a monomode light-conducting fiber having outer treatment (cladding) usually amounts to 125 μm. The diameter may be reduced with the aid of chemical treatment using an appropriate acid or heat treatment, so as to obtain a desired tapering 3.21. Antireflecting treatment 3.22 is then undertaken in the region of the section of lower diameter. These measures, too, contribute to one's being able to undertake reliable measurements even in tight recesses of a measuring object 8.

What is claimed is:

1. An interferometric measuring device for recording at least one of a shape, a roughness and a separation distance of a surface of a measuring object, comprising:

a modulating interferometer for receiving short-coherent radiation by a radiation source, and having a first beam splitter for splitting supplied radiation into a first beam component guided via a first arm, and into a second beam component guided via a second arm, one of which is shifted with respect to the other in one of its light phase and light frequency with a modulating device and passes through a delay line, and which are subsequently combined at an additional beam splitter of the modulating interferometer;

a measuring probe spatially separated from the modulating interferometer and at least couplable to it via a light-conducting fiber arrangement, in which the combined beam components are split in a common arm in a partially transmitting region into a measuring beam and a reference beam, and in which the measuring beam reflected at the surface and the reference beam reflected at a reference plane are superposed; and a receiver device and an evaluating device for converting the radiation supplied to it into electrical signals and for evaluating the signals based on the phase difference;

wherein the partially transmitting region is formed by a slanting exit face of a probe fiber at an exit angle with respect to an optical probe axis and a likewise slanting entrance face of a fiber section following on the object side, with respect to the optical probe axis at an entrance angle, a wedge-shaped gap being formed between the exit face and the entrance face.

2. The device of claim 1, wherein the exit face and the entrance face are inclined in a same direction with respect to the probe axis.

3. The device of claim 1, wherein the exit angle and the entrance angle are selected so that a Fresnel reflection is effected.

4. The device of claim 1, wherein the exit angle is between 5° and 8°, and the entrance angle is between the exit angle and 0°.

5. The device of claim 1, wherein the probe fiber and the fiber section are accommodated in a tubule-shaped accommodation axially aligned, which is surrounded by an outer tube of a measuring probe.

6. The device of claim 5, wherein on an end face of the accommodation that is remote from the measuring object, a positioning piece surrounds the probe fiber and is accommodated concentrically to the tube, and the fiber section is fixed in the object-side, front part of the accommodation and the probe fiber is fixed in at least one of the object-remote rear part of the accommodation and in and the tube.

7. The device of claim 6, wherein:

the front part of the accommodation is separated from the rear part of the accommodation by diametrically opposite gaps, one gap being limited at the rear as an elongation of the slanting exit face of the probe fiber, and the other gap being limited at the front in an elongation of the slanting entrance face, and the front part and the rear part of the accommodation are surrounded by a common sleeve-shaped retaining ring, which is surrounded on its outside by the tube.

8. The device of claim 1, wherein a front section of the fiber section has a lesser diameter compared to its rear section.

9. The device of claim 1, wherein an object-side exit face of the fiber section is inclined to a axis normal at an exit angle of at least 46°.

10. The device of claim 1, wherein the modulating interferometer includes at least partially a polarization-maintaining light-conducting structure which is one of an optical fiber conductor and an integrated optics arrangement, the light-conducting structure having at least one arm opened.

* * * * *